No. 821,724. PATENTED MAY 29, 1906.
J. H. LUBBERS.
APPARATUS FOR DRAWING GLASS SHEETS.
APPLICATION FILED AUG. 12, 1904.

5 SHEETS—SHEET 1.

WITNESSES
INVENTOR

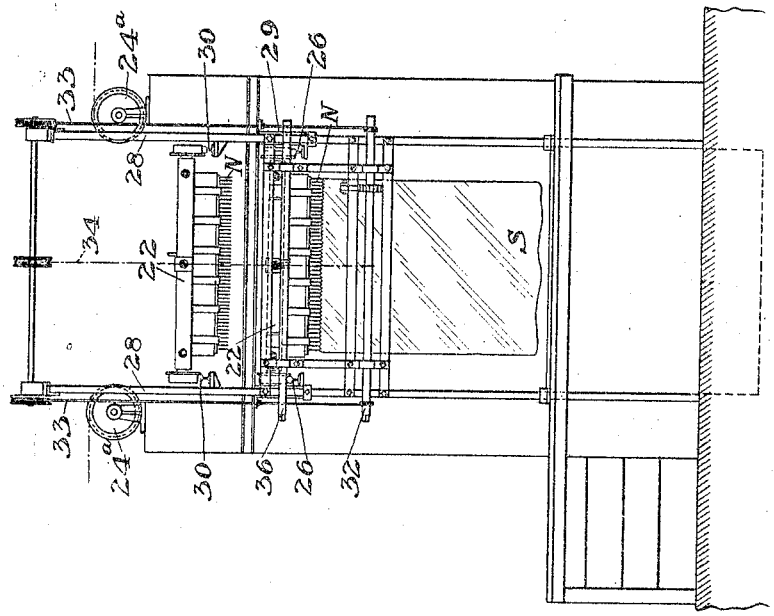
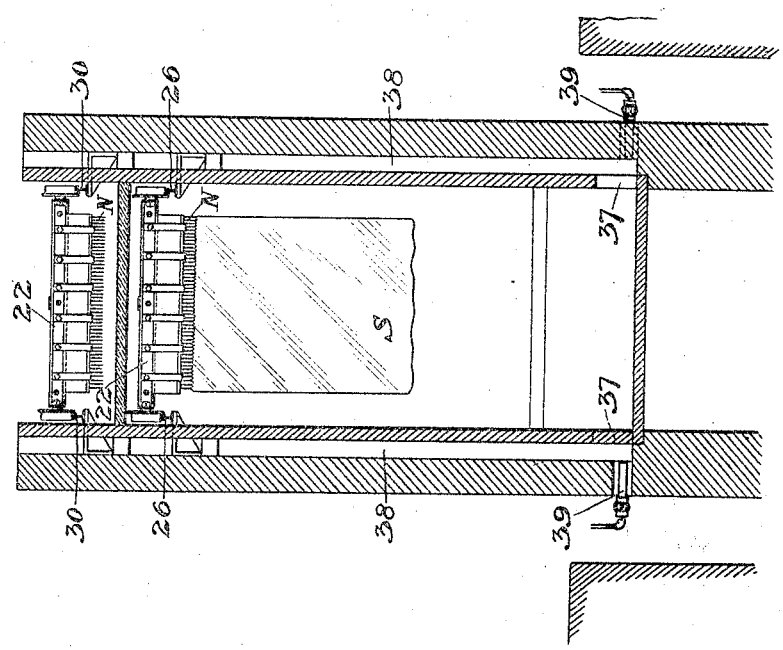

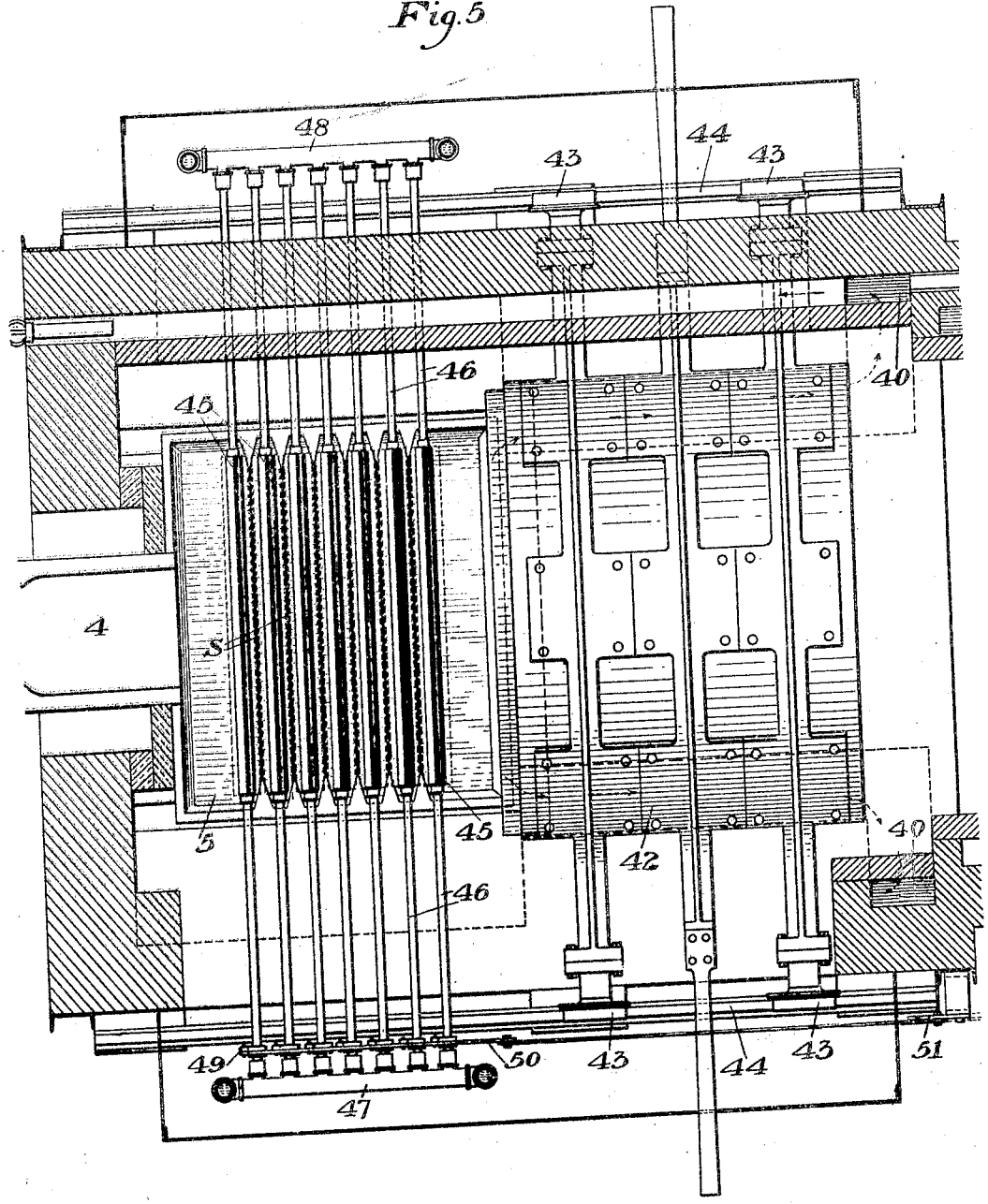

No. 821,724.  PATENTED MAY 29, 1906.
J. H. LUBBERS.
APPARATUS FOR DRAWING GLASS SHEETS.
APPLICATION FILED AUG. 12, 1904.

5 SHEETS—SHEET 5.

WITNESSES
Warren W. Swartz
John Miller

INVENTOR
John H. Lubbers
by Bakewell & Byrnes
his attorneys

UNITED STATES PATENT OFFICE.

JOHN H. LUBBERS, OF ALLEGHENY, PENNSYLVANIA, ASSIGNOR TO WINDOW GLASS MACHINE COMPANY, OF PITTSBURG, PENNSYLVANIA, A CORPORATION OF NEW JERSEY.

APPARATUS FOR DRAWING GLASS SHEETS.

No. 821,724.

Specification of Letters Patent.

Patented May 29, 1906.

Application filed August 12, 1904. Serial No. 220,485.

*To all whom it may concern:*

Be it known that I, JOHN H. LUBBERS, of Allegheny, Allegheny county, Pennsylvania, have invented a new and useful Apparatus for Drawing Glass Sheets, of which the following is a full, clear, and exact description, reference being had to the accompanying drawings, forming part of this specification, in which—

Figure 1:
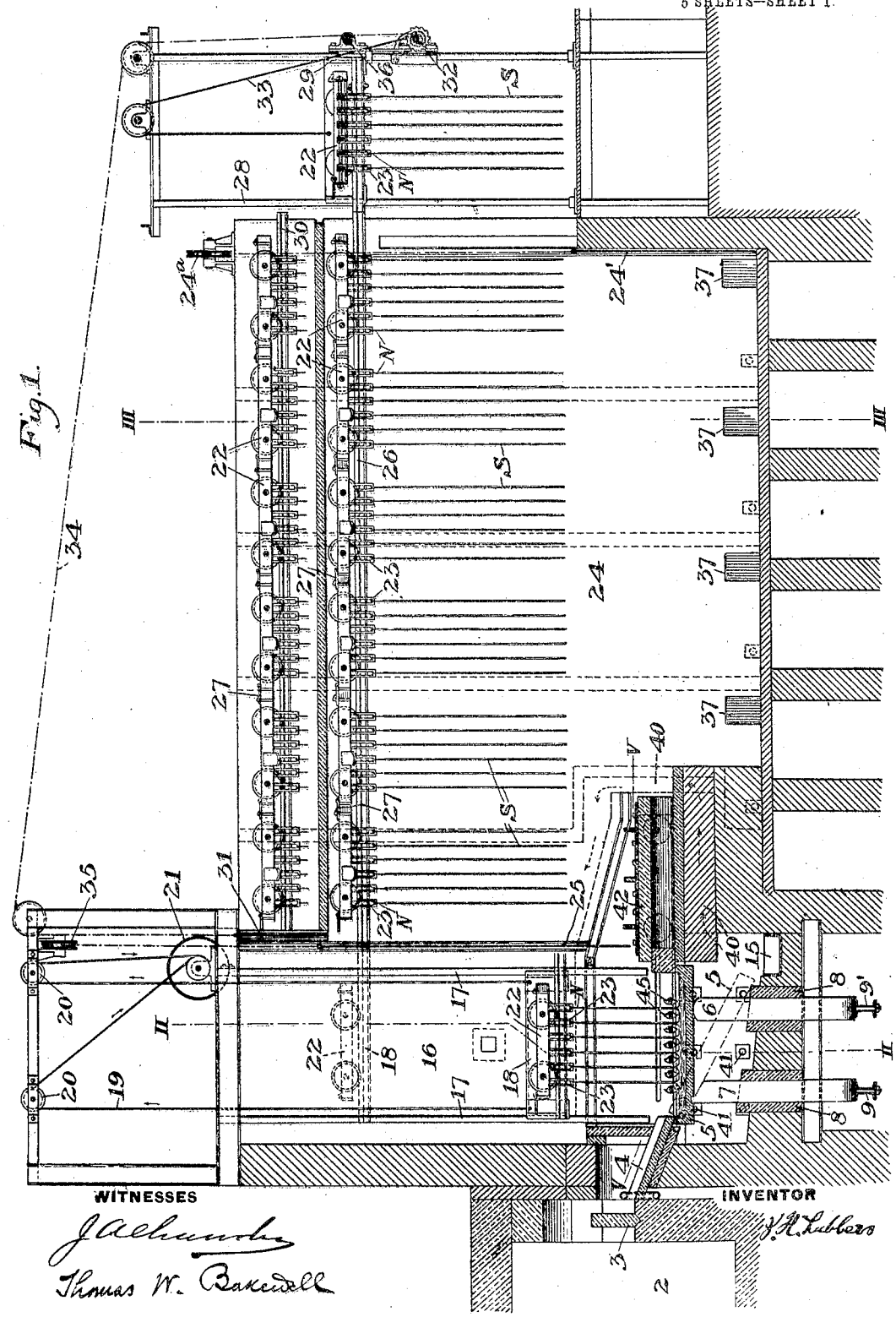
Figure 2:
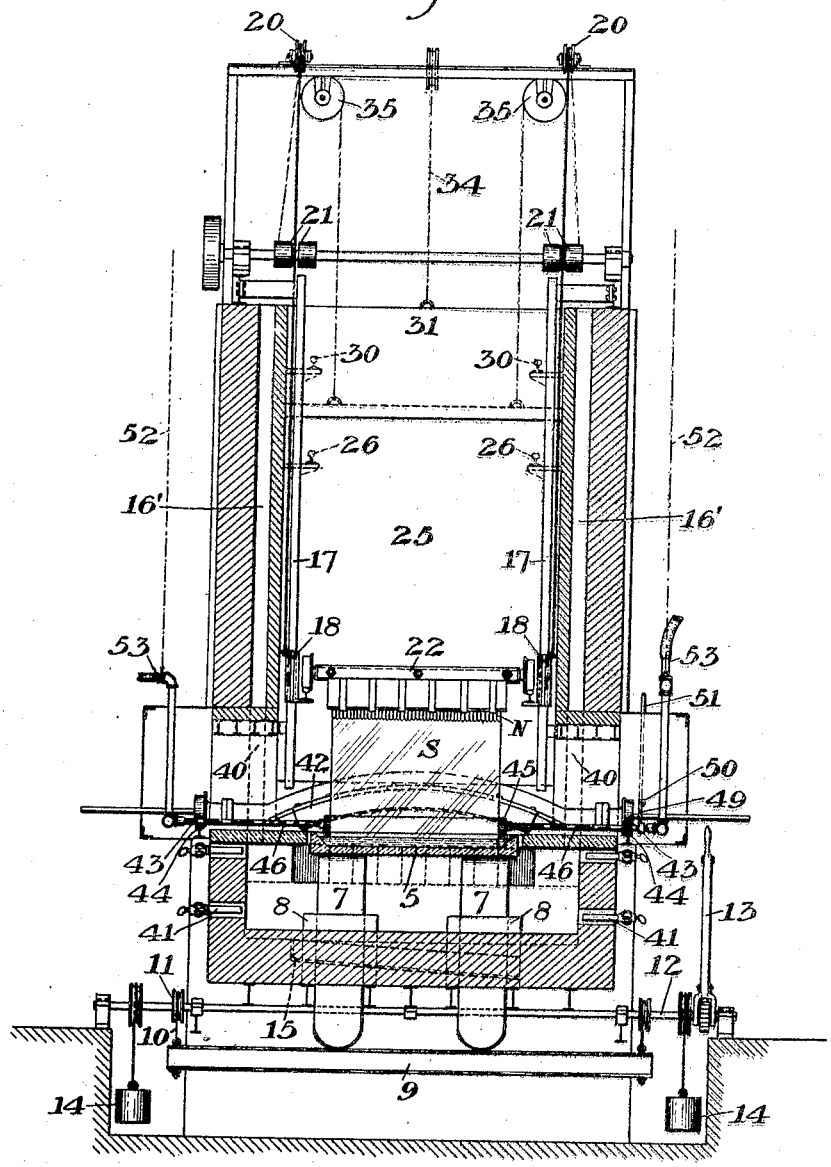
Figure 6:
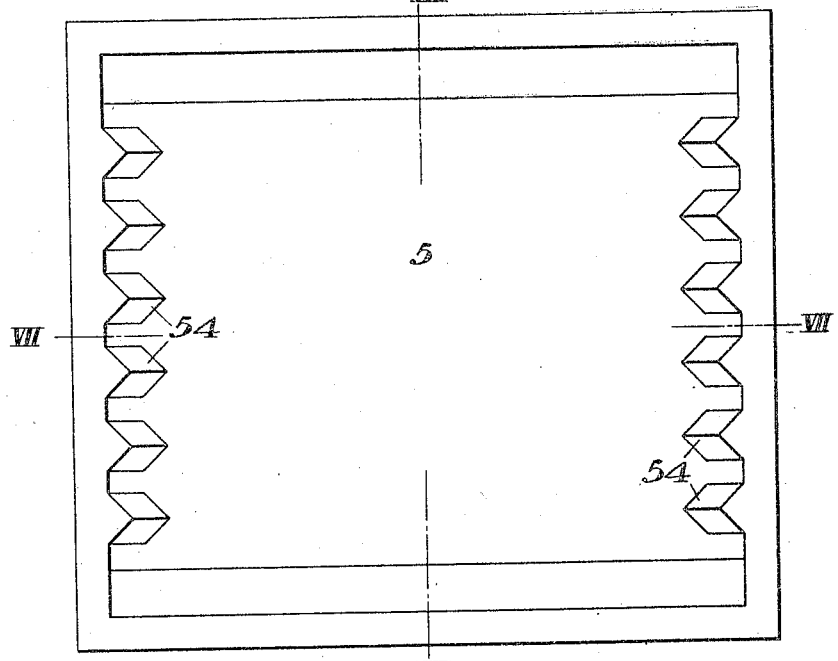
Figure 7:
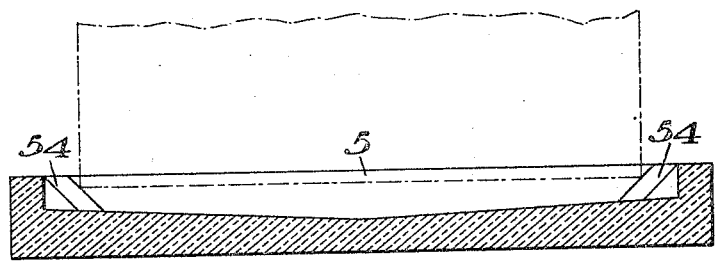
Figure 8:
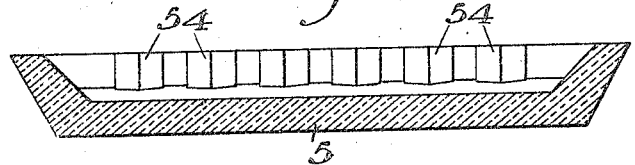

Figure 1 is a vertical longitudinal section of my improved drawing apparatus. Fig. 2 is a vertical cross-section on the line II II of Fig. 1. Fig. 3 is a vertical cross-section on the line III III of Fig. 1. Fig. 4 is an end elevation of the discharging end of the annealing-chamber. Fig. 5 is a sectional plan view, the section being on the line V V of Fig. 1, showing the apparatus on a larger scale. Fig. 6 is a plan view of the pan from which the glass sheets are drawn; and Figs. 7 and 8 are vertical sections on the lines VII VII and VIII VIII, respectively, of Fig. 6.

The present application is in part a division of my application, Serial No. 138,650, filed January 12, 1903.

In present apparatus, which is adapted for drawing a number of glass sheets at one operation, I provide a new mechanism for burning off the glass sheets—that is to say, separating them from the glass which remains in the pan at the end of the drawing operation. This device without disturbing the sheets which have been drawn shields them from the heat which is applied at the top of the pan for burning or melting off the lower ends of the sheet and confines the flame, so that it cannot pass up along the drawn sheets and warp them. I also provide means by which the heat which is employed for heating the pan is discharged into the hollow walls of the drawing-chamber, heating these walls, and thus applying heat to the edges of the glass sheets, and I employ burners by which direct heat can be applied to the hollow walls. I also provide means by which the baits on which the glass sheets are drawn are carried through the annealing-chamber and are returned to the drawing-chamber. My new device enables me to draw a much greater number of sheets at a time than has been heretofore possible. I also provide means by which the hot air in the annealing-chamber is drawn downwardly and thence preferably through the hollow walls of the annealing-chamber. This equalizes the temperature and prevents overheating of the upper ends of the glass sheets next to the bait, which is apt to cause breakage of the sheets when they are drawn out of the annealing-chamber. I also construct the annealing-chamber with a large space below the end of the glass sheet, so that in the event of breakage the broken pieces of glass can fall to the bottom of this space and will therefore not interfere with the operation of annealing or come into contact with the other glass sheets during their passage through the leer. The enlarged space at the bottom of the leer equalizes the temperature of the upper part of the leer in which the glass sheets pass, for the cold air will naturally seek the lowest part of the chamber, which in my apparatus is so far below the lower end of the glass sheets that the cold air cannot injuriously affect them. This cold air is carried away through ports in the bottom of the annealing-chamber, being displaced by hot air drawn from above. I am enabled by these devices to accomplish the annealing effectively in a shorter chamber than heretofore.

My invention also comprises an improved construction of the cover by which the pan is covered during the time when the residual glass from the last drawing operation is being reheated and poured out and during the time when a fresh charge of glass is being flowed from the tank into the pan.

My invention also relates to other novel features, which I will describe and claim.

In the drawings, 2 represents the end of a tank in which the glass is melted and from which it is flowed through an opening controlled by a refractory block 3 and a trough 4 into the drawing-pan 5, which is preferably supported upon refractory posts 6 7, movable vertically within guides 8 in the bottom of the pan-chamber and adapted to be lifted by frames 9 9', which engage their lower ends and are raised and lowered by chains 10, passing around pulleys 11 on shafts 12, and are operated by ratchet-levers 13, the shafts being preferably counterbalanced by weights 14. By raising both of the frames 9 9' simultaneously and to an equal extent the pan 5 may be raised and lowered in right lines, preserving its level position, and by keeping the frame 9 elevated and lowering only the frame 9' the pan may be tipped sidewise, as shown by dotted lines in Fig. 1, so as to pour its residue of glass into an inclined trough 15, whence it will be discharged outside the furnace structure.

16 is the drawing-chamber containing vertical elevator-slides 17 for the lift 18, which carries the cars with the bait-holders, by which the glass is drawn from the pan. This lift is raised and lowered vertically by suitable mechanism, preferably by chains or wire ropes 19, which pass over pulleys 20, and are wound by a drum 21, operated by any suitable motor device. The car 22 carries a series of bait-holders 23, each adapted, preferably, to receive a number of wire nails N or like devices and by means of the baits so constituted to draw a plurality of glass sheets S at one operation.

24 is the annealing-chamber, which communicates at the rear end with the drawing-chamber 16 and is provided with an intermediate damper 25. At the top of the annealing-chamber is a track 26 for the cars 22, which are raised successively by the lift with their sheets of glass and are pushed from the lift onto the track, as indicated by dotted lines in Fig. 1. Each car has preferably an automatic coupling device 27, consisting of a drop-link and lug, which when the car is pushed from the lift onto the track in the annealing-chamber will cause it to couple automatically with the adjoining car. This track 26 extends to the delivery end of the annealing-chamber, at which place there are vertical slides 28 for a lift 29, so that the cars may be raised and transferred to the return-track 30, by which they may be carried in succession to the top of the drawing-chamber 16 and there delivered as they are required upon the elevated lift 18. A damper 31 is provided to close the opening from the drawing-chamber after the car has been pushed from the lift. The lift 29 is operated by a ratchet-shaft 32 and rope 33, which shaft also by a rope 34 simultaneously operates the damper 31. The lower damper 25 is preferably operated by a separate rope 35. The cars are moved on the track 26, preferably by a winding-shaft 36 and a chain.

The annealing-chamber 24 has a damper 24' at its delivery end operated by chains passing over pulleys 24ᵃ. The annealing-chamber is preferably made of considerably greater height than the height of the glass sheets which are drawn, so as to provide below the sheets a large open space. (Shown in Fig. 1.) From the bottom of this space ports 37 lead into the space 38 of the hollow side walls of the annealing-chamber, having damper-controlled openings at the top, which may be closed partly or altogether, as desired. The hollow walls of the annealing-chamber are also heated by burners 39, (shown in Fig. 3,) the annealing-chamber being thus kept hot by the heat radiated from the glass sheets and by heat furnished by the burners in the hollow wall. By thus heating the walls the edges of the glass sheet are kept hot, causing the sheets to contract from the center, and thus very largely diminishing breaking and warping of the glass.

The side walls of the drawing-chamber 16 are in like manner made hollow, the vertical spaces 16', Fig. 2, being partly open at the top, provided with dampers, and communicating at the bottom through flues 40 with the portion of the drawing-chamber beneath the pan 5, which is heated by burners 41, the flame from these burners not only heating the bottom of the pan, but also by passing through the flues 40 into the hollow spaces 16' heating the side walls of the drawing-chamber, and thus keeping the edges of the glass sheets hot while they are being drawn. The degree of heat thus communicated to the side walls of the drawing-chamber and annealing-chamber may be regulated by closing to any desired extent the upper ports of the hollow wall-spaces.

42 is the cover which is moved over the pan 5 while it is being reheated to melt out the residue of glass and while the new charge of glass is being flowed into it from the tank. This cover, as shown in Figs. 1 and 2, is built of refractory material, preferably cased on the outside with a lining of metal, and is mounted at the ends on wheels 43, which run upon a track 44. This cover being arched is very strong and durable and provides a space above the pan in which a flame can be played for heating the glass in the pan. The cover is pulled back into the position shown in Fig. 1 while the glass sheets are being drawn and is pushed forward over the pan while the pan is being reheated or while the new charge is being flowed in.

For the purpose of shielding the upper portions of the drawn-glass sheets while the lower ends are being burned off from the residue of glass in the pan I employ a shield-frame composed of a series of hollow metal bars 45, oblong in cross-section and connected at the ends to water-supply pipes 46, leading to water inlet and outlet pipes 47 and 48, being swiveled thereto, so that they may be rotated simultaneously by crank-arms 49, operated by rods 50 and a suitable hand-lever 51. During the drawing operation the pipes 46 and water-cooled bars 45 are turned into the position shown in Fig. 1, so that their longer axes shall extend in a vertical direction, in which position they afford wide intermediate spaces between which the glass sheets can be drawn.

When it is desired to burn off the glass sheets at their lower ends from the residue of glass in the pan, the hand-lever 51 is operated to turn the bars 45, so that their longer axes shall extend in a nearly-horizontal direction, thus narrowing the open spaces between the glass sheets and confining the flame which is applied below them, so that it will not pass up along the sheets and warp the same. The amount of water flowing through these bars may be regulated according to the chill which is necessary in drawing the sheets of different thickness. In performing the operation of burning off the pan 5 is lowered, so as to bring its surface below the upper row of burners 41, the water-cooled bars 45 are then turned into their horizontal position, and a strong flame is directed from the burners 41 into the surface of the pan, which will rapidly melt off the glass connecting the sheets with the pan and will leave the sheets free to be lifted by raising the lift 18 into position for transferring the car from the drawing-chamber into the annealing-chamber. When the sheets have thus been burned off, the water-cooled shield is drawn up sufficiently to allow the cover to be moved over the pan, and when the pan has thus been covered it is heated sufficiently to melt the residue of glass into a very liquid condition. It is then tilted sidewise to discharge the glass, or as much of it as may be desired, into the trough 15, and it is then raised into horizontal position beneath the trough 4 to receive a fresh supply of glass from the tank.

The water-cooled shield-frame is provided with flexible pipe connections 53 and is supported by a lifting device which may consist of ropes or chains 52, (shown in Fig. 2,) by which it may be raised and lowered as desired when covering or removing the cover from the top.

In the figures on the fifth sheet of the drawings I show a construction of the pan from which the glass is drawn which is of great practical importance. This pan instead of having vertical straight inner sides is provided with inward projections or ribs 54, which are beveled, terminating, preferably, to a point, and are also preferably inclined. The glass sheets are drawn in lines extending between the apexes of the opposite projection, and the glass film adheres thereto, being held out thereby, so that the tendency of the sheet to contract at the lower end is counteracted, and the edges of the glass sheet being held out from the sides of the pan are kept in the hotter body of glass and are thus prevented from thickening, as they otherwise have a tendency to do. I prefer also to make the pan deeper at its middle than at its ends, as shown.

By providing the carrier with a group of glass-drawing baits arranged to be operated in a unit, as above described to simultaneously draw a plurality of sheets I obtain the very important advantage of causing the outer sheets to protect the inner ones from warping. It has been found in the drawing of single sheets upwardly within a drawing atmosphere that many of the sheets would warp during the drawing. By drawing a plurality of parallel sheets the outer sheets act as shields for the inner ones and the warping tendency is very largely overcome or reduced.

Within the scope of the invention as defined in the claims those skilled in the art will be able to modify the device in various ways and to use some of the elements and combinations above described without the others, since

What I claim is—

1. Apparatus for drawing glass sheets, comprising a carrier having connected thereto a group of glass-drawing baits, adapted to be raised from the glass and to be drawn from the chamber as a unit whereby the outer sheets of the group of drawn sheets protect the inner ones from warping; substantially as described.

2. Glass-drawing apparatus comprising a car carrying a group of baits, and means by which the car is raised from the glass and transferred to an annealing-chamber with the glass plates or sheets suspended in adjacent parallel planes, flatwise of the chamber; substantially as described.

3. Glass-drawing apparatus comprising a drawing-chamber, an annealing-chamber, tracks leading from the drawing-chamber into the annealing-chamber, and a return-track leading to the drawing-chamber; substantially as described.

4. Glass-drawing apparatus comprising a drawing-chamber, an annealing-chamber, tracks leading from the drawing-chamber to the annealing-chamber, and cars carrying groups of baits the parts being arranged to carry the groups of drawn plates or sheets suspended in adjacent parallel planes flatwise through the annealing-chamber; substantially as described.

5. Glass-drawing apparatus comprising a drawing-chamber and an annealing-chamber through which the glass sheets are carried flatwise in adjacent parallel planes, said annealing-chamber having a deep space below the glass sheet; substantially as described.

6. Glass-drawing apparatus comprising an annealing-chamber mechanism for carrying suspended glass sheets through the annealing-chamber and outlet-flues leading from the lower end of the chamber; substantially as described.

7. Glass-drawing apparatus comprising an annealing-chamber through which the glass sheets are carried in series in vertical position, hollow walls, and flues leading from the base of the chamber into the hollow walls; substantially as described.

8. Glass-drawing apparatus having means for drawing glass sheets, and shield members interposed between the sheets, and means by which the open spaces between the sheets are narrowed without moving the sheets; substantially as described.

9. Glass-drawing apparatus having means for drawing glass sheets, and means by which the open spaces between the sheets are narrowed without moving the sheets; substantially as described.

10. Glass-drawing apparatus having means for drawing glass sheets shield members interposed between the glass sheets and adapted to be turned to narrow the space between the sheets; substantially as described.

11. Glass-drawing apparatus having means for drawing glass sheets shield members interposed between the glass sheets and adapted to be turned to narrow the space between the sheets, and means for supplying heat to the glass below the shield for the purpose of burning off the sheets from the residual glass; substantially as described.

12. A shield comprising a series of water-cooled bars oblong in cross-section, and means for rotating the bars; substantially as described.

13. A shield comprising a series of water-cooled bars oblong in cross-section, means for rotating the bars, and means for raising and lowering the shield; substantially as described.

14. Glass-drawing apparatus comprising a drawing-chamber, an upwardly-movable lift, cars adapted to be carried by the lift, an annealing-chamber into which the cars are transferred from the lift, and means for returning the cars; substantially as described.

15. In glass-drawing apparatus, a drawing-pan having opposite walls provided with a number of inward projections separated by intermediate spaces or recesses; substantially as described.

16. In glass-drawing apparatus, a drawing-pan having opposite walls formed with a number of beveled inward projections separated by intermediate spaces or recesses; substantially as described.

17. In a glass-drawing apparatus, a drawing-pan having opposite walls formed with a number of inward projections having beveled and inclined surfaces, and separated by intermediate spaces or recesses; substantially as described.

18. In glass-drawing apparatus, a drawing-pan deeper underneath the center portion of the article being drawn than at the end portions thereof; substantially as described.

19. In glass-drawing apparatus, a receptacle or receptacles for molten glass, a common drawing-chamber above the same, and mechanism for simultaneously drawing a plurality of sheets upwardly within the drawing-chamber, whereby the outer sheets protect the inner sheets from warping; substantially as described.

20. In glass-drawing apparatus, a drawing-chamber within which the sheets are drawn and having an inclosed atmosphere, and drawing mechanism arranged to simultaneously draw a series of sheets upwardly within the chamber whereby the outer sheets protect the inner ones from warping; substantially as described.

In testimony whereof I have hereunto set my hand.

JOHN H. LUBBERS.

Witnesses:
THOMAS W. BAKEWELL,
GEO. B. BLEMING.